United States Patent [19]
Sullivan

[11] Patent Number: 6,128,249
[45] Date of Patent: Oct. 3, 2000

[54] METHOD OF OPERATING A CONTINUOUS WAVE SONAR SYSTEM

[75] Inventor: Michael J. Sullivan, Oakdale, Conn.

[73] Assignee: The United States of America as represented by the Secretary of the Navy, Washington, D.C.

[21] Appl. No.: 08/953,787

[22] Filed: Oct. 14, 1997

[51] Int. Cl.[7] .................................................. G01S 15/00
[52] U.S. Cl. .............................................. 367/87; 367/901
[58] Field of Search .............................. 367/87, 101, 100, 367/135, 99, 905, 901

[56] References Cited

U.S. PATENT DOCUMENTS

| | | | |
|---|---|---|---|
| 3,064,234 | 11/1962 | Barrett | 367/101 |
| 3,742,437 | 6/1973 | Thiele | 367/101 |
| 4,933,914 | 6/1990 | Feintuch et al. | 367/87 |

*Primary Examiner*—Ian J. Lobo
*Attorney, Agent, or Firm*—Michael J. McGowan; Prithvi C. Lall; Michael F. Oglo

[57] ABSTRACT

An improved method is provided for operating a continuous wave sonar system. At time of transmission, a plurality of acoustic pulses are transmitted one right after another. Each pulse has a unique frequency and is of a time duration that is approximately one second long. The pulses are characterized by a separation frequency representing a difference in frequency between numerically successive frequencies. However, the pulses are staggered with respect to frequency. In the preferred embodiment, each successively transmitted one of the pulses is separated in frequency from an immediately preceding transmitted one of the pulses by an amount greater than the separation frequency. These multiple pulses seperated in time and in frequency, reduce the effects of frequency speading caused by the medium, resulting in a sonar with enhanced detection performance.

20 Claims, 3 Drawing Sheets

METHOD OF OPERATING A CONTINUOUS WAVE SONAR SYSTEM

CROSS-REFERENCE TO RELATED PATENT APPLICATIONS

This patent application is co-pending with one related U.S. Pat. No. 5,774,422 entitled "Method of Amplitude Shading in the Time Domain to Control Side Lobes in the Frequency Domain"(Navy Case No. 77382), filed Aug. 15, 1997, by the same inventor as this patent application.

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to sonar systems, and more particularly to a method of operating a continuous wave (CW) sonar system using multiple, unique-frequency pulses.

(2) Description of the Prior Art

In the field of continuous wave active sonar, it is known that performance can be enhanced by lengthening the transmission pulse. This results in narrow transmission bandwidths since bandwidth is equal to 1/T (units of hertz or Hz) where T is the length in time of the transmission pulse in seconds. Such narrower transmission provides fine frequency resolution at the receiver portion of the sonar system thereby providing good noise discrimination. However, in the medium frequency range of 1.5 to 5 kHz, usually target dynamics and the environment spread the bandwidth of an echo return to 1 Hz or more no matter how narrow the transmission pulse. Thus, while long transmission pulses offer greater transmission sharpness, most of this transmission energy is wasted as echo returns spread to at least 1 Hz.

SUMMARY OF THE INVENTION

Accordingly, it is an object of the present invention to provide a method of operating a continuous wave active sonar that utilizes all of the energy of the transmitted wave while still allowing for good target discrimination in the presence of noise.

Other objects and advantages of the present invention will become more obvious hereinafter in the specification and drawings.

In accordance with the present invention, an improved method is provided for operating a continuous wave sonar system. At time of transmission, a plurality of acoustic pulses are transmitted one right after another. Each pulse has a unique frequency and is of a time duration that is approximately one second long. The pulses are characterized by a separation frequency representing a difference in frequency between numerically successive frequencies. However, the pulses are staggered with respect to frequency. In the preferred embodiment, each successively transmitted one of the pulses is separated in frequency from an immediately preceding transmitted one of the pulses by an amount greater than the separation frequency. Should the sonar system employ limited dynamic range amplifiers, a cosine$^2$ with a DC offset amplitude shading function can be used to control input power to the amplifiers in order to reduce transmission side lobes.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1:
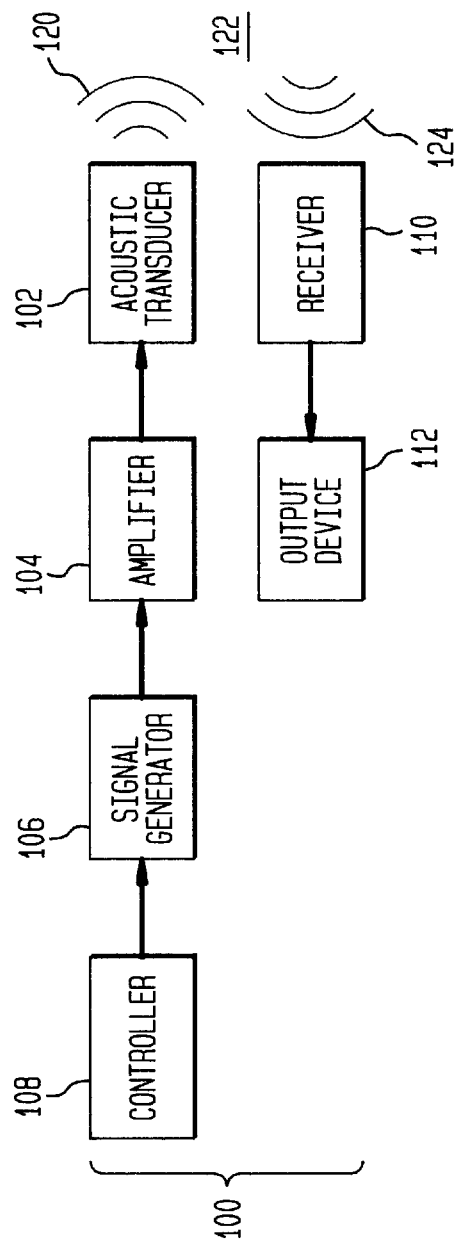
FIG. 1 is a functional block diagram of a sonar system used to carry out the method of the present invention.

Referring now to the drawings, and more particularly to FIG. 1, a block diagram of a continuous wave (CW) sonar system used to carry out the method of the present invention is shown and referenced generally by numeral 100. Such sonar systems are well understood in the art and will therefore only be described briefly herein. System 100 includes an acoustic transducer 102 (or an array of acoustic transducers) for outputting acoustic pulses 120 into a fluid medium 122 when driven by an amplifier 104 (or a corresponding plurality of amplifiers). Signal waveforms supplied to amplifier 104 are generated by signal generator 106 as controlled by controller 108 which is operated in accordance with the method of the present invention. Controller 108 and signal generator 106 are operated to produce a series of waveforms which, when amplified by amplifier 104, generate a plurality of acoustic pulses 120. Echoes or returns 124 generated in fluid medium 122 as a result of acoustic pulses 120 are received at a receiver 110 (or an array of receivers). Signal waveforms indicative of returns 124 are then output to an output device 112 such as a display or memory.

Figure 2:
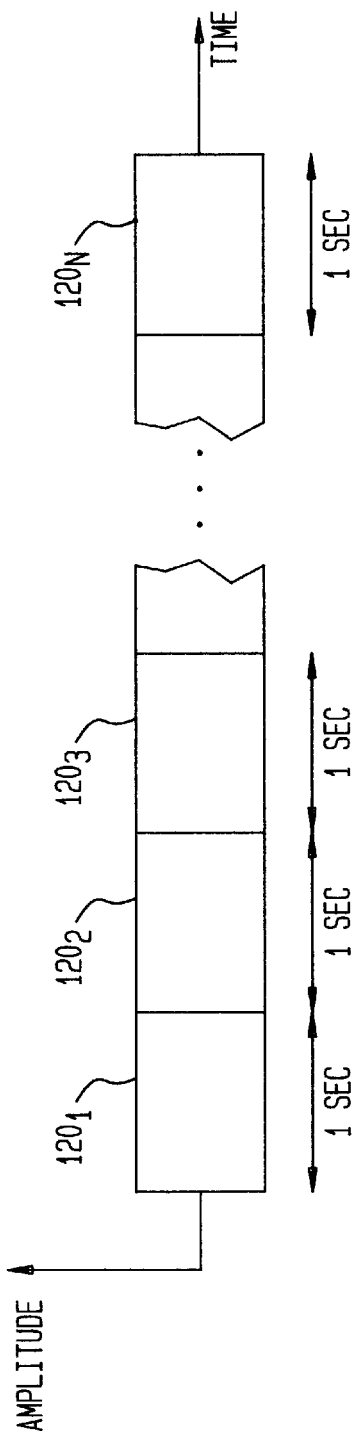
FIG. 2 depicts an amplitude envelope versus time for a series of pulses transmitted by the sonar system in accordance with the method of the present invention.

Referring now to FIG. 2, an amplitude envelope versus time plot of N acoustic pulses $120_1$, $120_2$, $120_3$, ... $120_N$ generated in accordance with the method of the present invention is shown. Each pulse is approximately one second in duration and is characterized by a unique frequency (e.g., $f_1 \neq f_2 \neq f_3 \neq \ldots f_N$) with the frequency separation between any two numerically successive frequencies being the same. However, the pulses are staggered during transmission with respect to their frequencies. That is, the frequency of each successive pulse can be greater than or less than the frequency of the previous pulse. This reduces the possibility of interference during reception.

It is preferred that the difference in frequency between any two successively transmitted pulses be greater than the frequency separation between numerically successive pulses. For example, if four acoustic pulses having respective frequencies of 3.1 kHz, 3.2 kHz, 3.3 kHz and 3.4 kHz (i.e., separation frequency of 100 Hz) were to be transmitted, appropriate staggering in the present invention could be achieved by transmitting the pulses in the order:

$f_1$=3.3 kHz, $f_2$=3.1 kHz, $f_3$=3.4 kHz, $f_4$=3.2 kHz.

Naturally, other such orders are possible.

The frequency separation between numerically successive pulses, or $\Delta f$ is a function of the frequency of the transmitter and the relative speed between the source of the transmitted acoustic pulses (e.g., the vessel on which the sonar system is located) and the target of interest. The general relationship for $\Delta f$ is given as $$\Delta f = \frac{2vf}{c} \quad (1)$$

where v is the maximum expected relative speed between the source and target, f is an operation frequency of the transmitter and c is the velocity of sound in water. For example, if the fluid medium was water (c=4900 feet/second), the maximum expected relative velocity v was 50 knots, 83.3 feet/second, and a typical frequency of operation was 3 kHz, $\Delta f$ would be equal to or greater than 102 Hz.

$$\Delta f = \frac{2(83.3 \text{ ft/sec})(3000 \text{ Hz})}{4900 \text{ ft/sec}} \simeq 102 \text{ Hz} \quad (2)$$

Each one second pulse in the present invention results in a transmission bandwidth of 1 Hz, the energy of which can be fully utilized since any return echo will be approximately 1 Hz. In addition, good target (or noise) discrimination is achieved since returns are being generated at the plurality of N frequencies. Handling of such returns by receiver 110 and output device 112 (e.g., a display) for good target/noise discrimination can be accomplished in a variety of ways, two of which will be explained by way of example.

Figure 3:
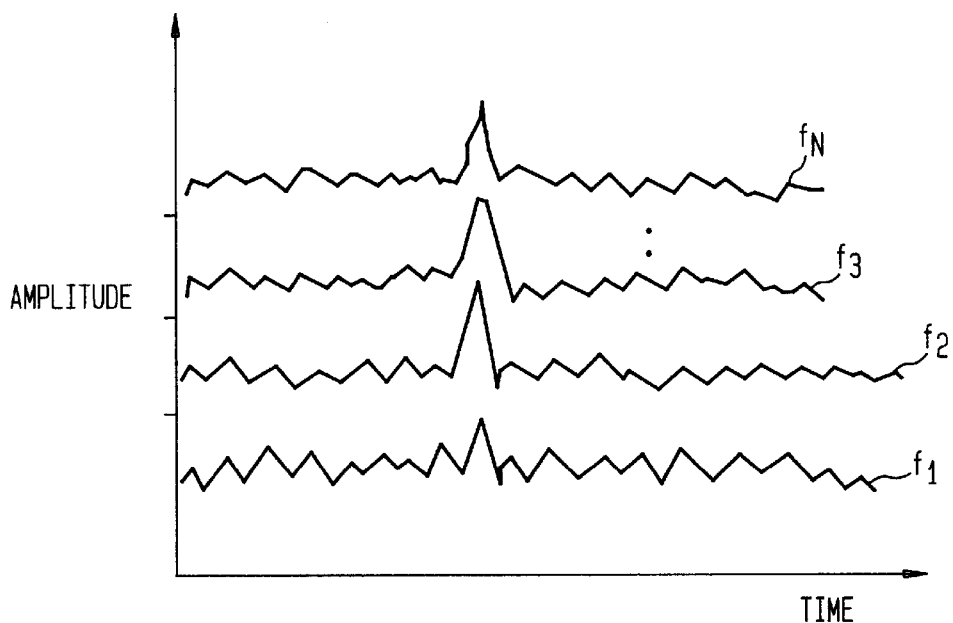
FIG. 3 is a graph of amplitude versus time for a plurality of appropriately delayed returns generated by each of the unique-frequency transmissions such that each return is referenced to the same time line for ease of comparison.

Because of the environment, coherence between the various returns is not assumed. Returns can be received and appropriately delayed in time in correspondence their time of transmission. In this way, return "peaks" can be approximately aligned as the amplitude of each return is plotted as a function of the unique frequency. If this is done simultaneously for all returns at each transmission frequency, the human operator can easily evaluate the various returns to discriminate a target from clutter. For example, as shown in FIG. 3, the waveform of the returns at frequencies $f_1$ through $f_N$ are plotted simultaneously. It should be noted that even though the returns are non-coherent, the peak returns will approximately coincide if the returns are appropriately delayed in time in correspondence with their respective relative time of transmission.

Another way of handling the returns is for the receiver to appropriately delay the returns and then form a non-coherent sum of the returns. Once again, the environment prohibits strict coherence between the returns. However, in general, the non-coherent summation of the returns will cause a large peak to occur when a target is encountered. The remaining additive noise and clutter of the various returns will tend to add less due to the reduced coherence, this sum is also shown in FIG. 3.

The present invention can further employ amplitude shading of the transmitted pulses to reduce noise and clutter in the returns. When a CW sonar system uses modern linear output amplifiers, amplitude shading in the frequency domain is easily achieved because such linear output amplifiers have a dynamic range which is generally on the order of 40 dB or greater. However, many sonar systems use limited dynamic range amplifiers (i.e., dynamic range of less than 20 dB) that are generally considered "nonlinear". If conventional full amplitude shading in the frequency domain is applied to such limited dynamic range amplifiers, the limited dynamic range of the amplifiers will not permit these waveforms. Accordingly, if amplifier(s) 104 represent limited dynamic range amplifier(s), amplitude shading in the time domain can be used as described in the aforementioned co-pending patent application, the teachings of which are hereby incorporated by reference. This will further improve the ability of the sonar system to detect a slow-moving Doppler target.

Figure 4:
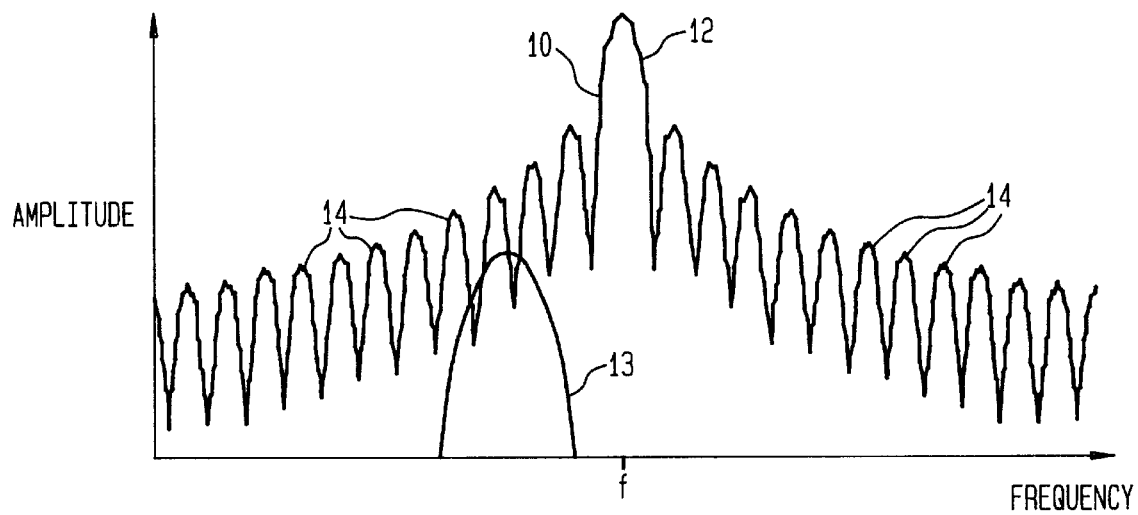
FIGS. 4A and 4B are a graphs of amplitude versus frequency showing a plot of a transmitted acoustic wave and a Doppler return from a slow-moving target being masked by the side lobes of the transmitted wave.

As described in my co-pending patent application (Navy Case No. 77382), the presence of strong frequency side lobes can mask such slow-moving Doppler targets. This is shown graphically in FIGS. 4A and 4B where respective transmitted frequency responses 10 and 15 have respective main lobes 12 and 17 centered at frequency f and respective side lobes 14 and 16 surrounding respective main lobes 12 and 17. A slow-moving target Doppler return 13 is masked by one or more of the respective side lobes 14 and 16 because its amplitude is greater than that of return 13. Thus, to obtain an improvement in performance at such slow target speeds where only small Doppler shifts are present, the relatively strong frequency side lobes of unshaded CW pulses can be reduced by amplitude shading, as illustrated in FIG. 4B, which shows return 13 to be of greater in amplitude that at the reduced side lobes 16 of the amplitude shaded transmitted frequency response 15.

Figure 5:
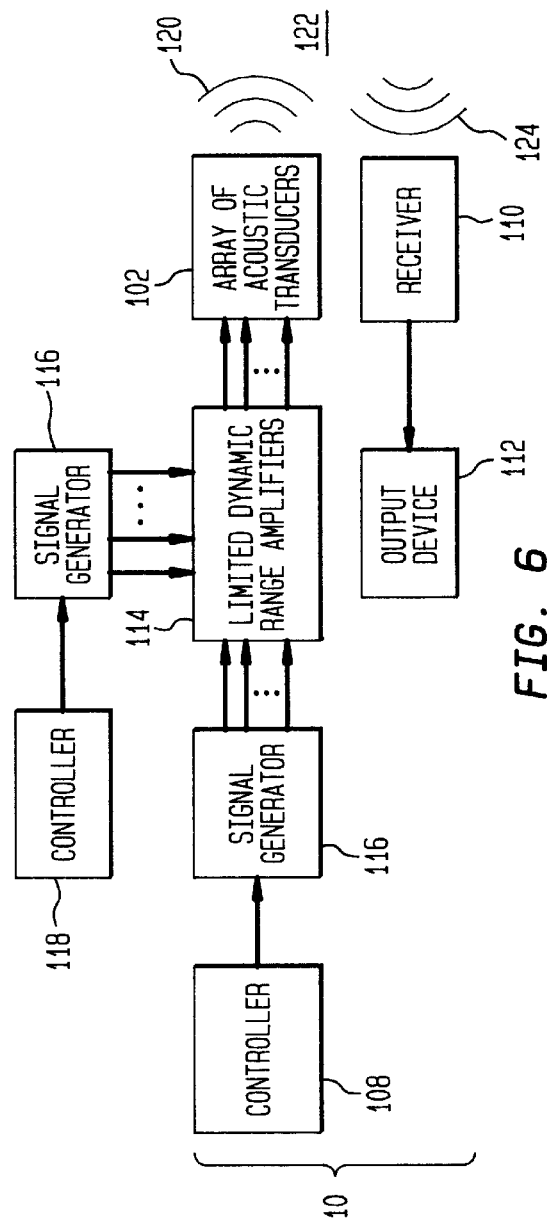
FIG. 5 is a functional block diagram of the sonar system further adapted to implement input amplitude shading when a plurality of limited dynamic range amplifiers are used in the sonar system.

In FIG. 5, a block diagram is shown of a sonar system 101 having a plurality of limited dynamic range amplifiers 114. System 101 is adapted to implement input amplitude shading in the time domain. The elements of system 101 that coincide with that of system 100 (FIG. 1) are referenced with the same reference numerals and will not be described further. It will be assumed that system 101 uses an array of acoustic transducers 102 for transmitting acoustic pulses when driven by a corresponding plurality of limited dynamic range amplifiers 114. For purpose of the present invention, a limited dynamic range amplifier is one having a dynamic range of less than 20 dB and is therefore generally considered to be nonlinear. Input power supplied to each of amplifiers 114 is controlled by signal generator 116 and controller 118.

Referring again to FIG. 4A, the output of each amplifier 114 has a frequency response 10 generated when the amplifier is turned on and then off where full input power is applied and then removed. The function governing this kind of application of the input power can be modeled as a square wave pulse envelope that lasts for a specified time referred to herein as $T_1$. Frequency response 10 is defined by main lobe 12 with its peak output centered at a desired frequency of operation f. A plurality of side lobes 14 surround main lobe 12. The amplitude shading described herein realizes main lobe 12 while reducing side lobes 14 in FIG. 4A and 16 in FIG. 4B so that return 13 is not masked by the amplifier's output, as shown in FIGS. 4A and 4B.

Figure 6:
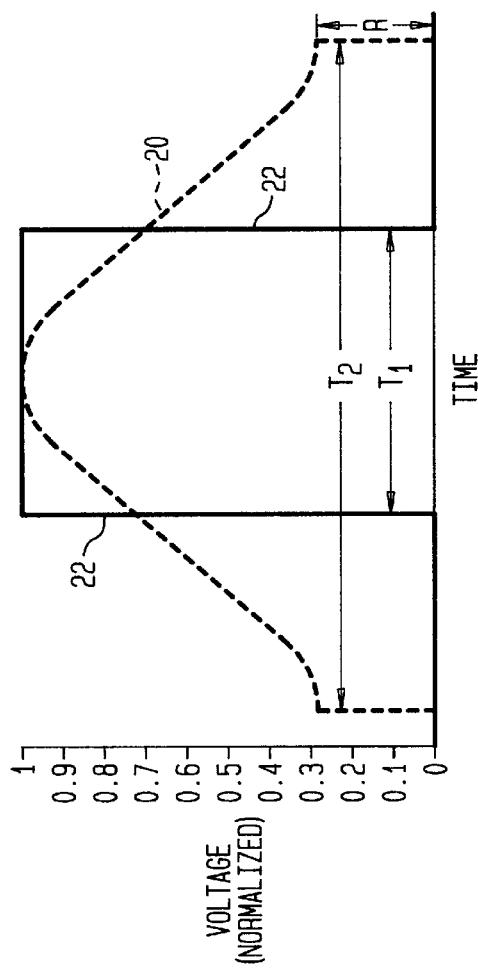
FIG. 6 depicts a normalized voltage versus time graph of the amplitude shading function.

In general, controller 118 controls signal generator 116 to control how input power is supplied to each amplifier 114. More specifically, controller 118 applies a cosine$^2$ function that starts at a DC voltage offset. This shading fucntion is of the form $$R+(1-R)\cos^2 \phi \quad (3)$$

where R represents a minimum turn-on voltage for each of amplifiers 114 that has been normalized to 1 volt, and where $\phi$ ranges from $-\pi/2$ to $+\pi/2$ in order to cover one-half cycle of the cosine$^2$ function. The minimum turn-on voltage R is defined herein as the minimum voltage required to start-up each of amplifiers 114. That is, below this minimum, there is insufficient input voltage to allow amplifier 114 to produce an output. Equation (2) is shown graphically in FIG. 6 where curve 20 represents the amplitude shading function controlling the input power and curve 22 represents a square wave pulse lasting for the specified time $T_1$.

In the past, amplitude shading of such amplifiers 114 was not performed because of the inherent energy reduction and widening of the main lobe of the transmitted pulse. However, both of these problems are overcome by increasing the time over which the input power is applied to an amplifier 114 relative to the specified time $T_1$ over which amplifiers are normally switched on and then off to help generate an output pulse of specified output energy $E_1$. Referring again to FIG. 6, the time $T_2$ (during which curve 20 controls the input power for time domain amplitude shading) is greater than $T_1$.

To maintain system performance, the output pulse produced when input power is controlled in accordance with curve 20 (equation (2)) should have as much energy as the output pulse generated when input power is supplied in accordance with curve 22. In other words, if the energy of the output pulse produced when input power is controlled by equation (2) is denoted $E_2$, $T_2$ should be determined such that $$E_1 \approx E_2 \qquad (4)$$

Since energy is power (P) multiplied by time (T) and P is proportional to voltage squared ($V^2$), the integral $$\int_0^T V^2 T_{dt} \qquad (5)$$

should be the same for the output pulse produced when either curve 20 or curve 22 is used to control the input power to amplifier 104. Thus, the relative time $T_2$ with the same energy can be determined from the relationship $$T_2 = \frac{T_1 \pi}{\int_{-\pi/2}^{+\pi/2} \{R + (1-R)\cos^2\theta\}^2 d\theta} \qquad (6)$$

where $\pi$ is the energy of an unshaded pulse of amplitude one (1) over a "time" of $-\pi/2$ to $+\pi/2$ ($-\pi/2$ to $+\pi/2$ was chosen for time to facilitate calculations using a half cycle of the cosine squared shading function)

$$E_1 = \int_{-\pi/2}^{+\pi/2} (1)^2 d\theta = \pi \qquad (7)$$

The energy of the shaded pulse over the same "time" of $-\pi/2$ to $+\pi/2$ is $$E_2 = \int_{-\pi/2}^{+\pi/2} \{R + (1-R)\cos^2\theta\}^2 d\theta \qquad (8)$$

The relative pulse stretching, $T_2/T_1$, needed to obtain the same energy $E_2 = E_1$ is thus obtained by dividing $E_1$ ($\pi$) by $E_2$ as shown above.

The advantages of the present invention are numerous. By limiting each acoustic transmission to one second in length, a sonar system is able to utilize all of the energy of the transmitted pulse. The utilization of a plurality of (one second long) unique-frequency pulses staggered during transmission with respect to frequency provides for good target and/or noise discrimination. Further, when limited dynamic range amplifiers are used in the sonar system, amplitude shading in the time domain can be employed in order to control transmission side lobes in the frequency domain.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of operating a continuous wave sonar system that utilizes a plurality of limited dynamic range amplifiers coupled to and driving a plurality of acoustic transducers, each of said plurality of limited dynamic range amplifiers generating a corresponding output with a frequency response when input power is applied thereto, said frequency response defined by a main lobe with a peak output centered at a desired frequency of operation and a plurality of side lobes surrounding said main lobe, said method comprising the steps of:

controlling amplitude of said input power to each of said plurality of limited dynamic range amplifiers in accordance with an amplitude shading function to modify each said corresponding output such that the width of each said main lobe is realized while said plurality of side lobes surrounding each said main lobe are reduced, said amplitude shading function being a one-half cycle cosine$^2$ function with a DC offset; and transmitting a plurality of acoustic pulses one right after another into a fluid medium from said plurality of transducers as driven by said plurality of limited dynamic range amplifiers, each of said plurality of acoustic pulses being of a unique frequency and of a time duration that is approximately one second long, said plurality of acoustic pulses being staggered with respect to each said unique frequency, wherein echo returns at each said unique frequency are generated.

2. A method according to claim 1 wherein each said unique frequency is in the range of approximately 1.5 kHz to 5 kHz.

3. A method according to claim 1 further comprising the steps of:

receiving said echo returns at said sonar system; and displaying said echo returns simultaneously as a function of each said unique frequency.

4. A method according to claim 1 further comprising the steps of:

receiving said echo returns at said sonar system;

combining said echo returns to form a non-coherent summation; and displaying said non-coherent summation.

5. A method according to claim 1 wherein said amplitude shading function is of the form $$R+(1-R)\cos^2\phi$$

where R<1 and $\phi$ ranges from $-\pi/2$ to $+\pi/2$.

6. A method according to claim 5 wherein said amplitude shading function is applied for a period of time $T_2$ with the same energy of a shaded envelope that is approximately determined in accordance with the relationship $$T_2 = \frac{T_1 \pi}{\int_{-\pi/2}^{+\pi/2} \{R + (1-R)\cos^2\theta\}^2 d\theta}$$

where π is the energy of an unshaded pulse of amplitude one (1) over a "time" of −π/2 to +π/2 which time is chosen to facilitate calculations using a half cycle of the cosine squared shading function.

7. A method of operating a continuous wave sonar system that utilizes a plurality of limited dynamic range amplifiers coupled to and driving a plurality of acoustic transducers, each of said plurality of limited dynamic range amplifiers generating an output pulse with a frequency response when a pulse of input power is applied thereto, said frequency response defined by a main lobe with a peak output centered at a desired frequency of operation and a plurality of side lobes surrounding said main lobe, wherein an energy $E_1$ associated with said output pulse is produced when said pulse of input power is a rectified pulse of time duration $T_1$, said method comprising the steps of:

controlling amplitude of said pulse of input power to each of said plurality of limited dynamic range amplifiers in accordance with an amplitude shading function to modify each said output pulse such that the width of each said main lobe is realized while said plurality of side lobes surrounding each said main lobe are reduced, said amplitude shading function being a one-half cycle cosine² function with a DC offset applied over a period of time $T_2$ that is greater than said time duration $T_1$ while an energy $E_2$ of said output pulse so modified is approximately equal to said energy $E_1$; and transmitting a plurality of acoustic pulses one right after another into a fluid medium from said plurality of transducers as driven by said plurality of limited dynamic range amplifiers, each of said plurality of acoustic pulses being of a unique frequency and of a time duration that is approximately one second long, said plurality of acoustic pulses being staggered with respect to each said unique frequency, wherein echo returns at each said unique frequency are generated.

8. A method according to claim 7 wherein said amplitude shading function is of the form $$R + (1-R)\cos^2 \phi$$

where R is representative of a minimum turn-on voltage for each of said plurality of limited dynamic range amplifiers, said minimum turn-on voltage being normalized to 1 volt, and where φ ranges from −90° to 90°.

9. A method according to claim 8 wherein said time duration $T_2$ is approximately determined in accordance with the relationship $$T_2 = \frac{T_1 \pi}{\int_{-\pi/2}^{+\pi/2} \{R + (1-R)\cos^2\theta\}^2 d\theta}$$

where $T_1$ is the time of said output pulse when said pulse of input power is not controlled by said amplitude shading function.

10. An improved method of operating a continuous wave sonar system from onboard a vessel, said method comprising the step of transmitting a plurality of acoustic pulses one right after another into a fluid medium towards a moving target, each of said plurality of acoustic pulses being of a unique frequency and of a time duration that is approximately one second long, said plurality of acoustic pulses characterized by a separation frequency representing a difference in frequency between numerically successive frequencies of said plurality of acoustic pulses, said plurality of acoustic pulses being staggered with respect to each said unique frequency such that each successively transmitted one of said plurality of acoustic pulses is separated in frequency from an immediately preceding transmitted one of said plurality of acoustic pulses by an amount greater than said separation frequency, wherein echo returns at each said unique frequency are generated.

11. A method according to claim 10 wherein each said unique frequency is in the range of approximately 1.5 kHz to 5 kHz.

12. A method according to claim 10 wherein said separation frequency is determined in accordance with the relationship $$\Delta f \frac{2vf}{c}$$

where v is a maximum expected relative speed between said moving target and said vessel, f is a typical transmit frequency of said sonar system, and c is the speed of sound in said fluid medium.

13. A method according to claim 10 further comprising the steps of:

receiving said echo returns at said sonar system; and displaying said echo returns simultaneously as a function of each said unique frequency.

14. A method according to claim 10 further comprising the steps of:

receiving said echo returns at said sonar system;

combining said echo returns to form a non-coherent summation; and displaying said non-coherent summation.

15. A method of operating a continuous wave sonar system that utilizes a plurality of limited dynamic range amplifiers coupled to and driving a plurality of acoustic transducers, each of said plurality of limited dynamic range amplifiers generating a corresponding output with a frequency response when input power is applied thereto, said frequency response defined by a main lobe with a peak output centered at a desired frequency of operation and a plurality of side lobes surrounding said main lobe, said method comprising the steps of:

controlling amplitude of said input power to each of said plurality of limited dynamic range amplifiers in accordance with an amplitude shading function to modify each said corresponding output such that the width of each said main lobe is realized while said plurality of side lobes surrounding each said main lobe are reduced, said amplitude shading function being a one-half cycle cosine² function with a DC offset; and transmitting a plurality of acoustic pulses one right after another into a fluid medium towards a moving target from said plurality of acoustic transducers as driven by said plurality of limited dynamic range amplifiers, each of said plurality of acoustic pulses being of a unique frequency and of a time duration that is approximately one second long, said plurality of acoustic pulses characterized by a separation frequency representing a difference in frequency between numerically successive frequencies of said plurality of acoustic pulses, said plurality of acoustic pulses being staggered with respect to each said unique frequency such that each successively transmitted one of said plurality of acoustic pulses is separated in frequency from an immediately preceding transmitted one of said plurality of acoustic pulses by an amount greater than said separation frequency, wherein echo returns at each said unique frequency are generated.

16. A method according to claim 15 wherein said amplitude shading function is of the form $$R+(1-R)\cos^2\phi$$

where $R<1$ and $\phi$ ranges from $-\pi/2$ to $+\pi/2$.

17. A method according to claim 16 wherein said amplitude shading function is applied for a period of time $T_2$ that is approximately determined in accordance with the relationship $$T_2 = \frac{T_1\pi}{\int_{-\pi/2}^{+\pi/2}\{R+(1-R)\cos^2\theta\}^2 d\theta}$$

where $T_1$ is the time of said corresponding output when said input power is not controlled by said amplitude shading function.

18. A method of operating a continuous wave sonar system that utilizes a plurality of limited dynamic range amplifiers coupled to and driving a plurality of acoustic transducers, each of said plurality of limited dynamic range amplifiers generating an output pulse with a frequency response when a pulse of input power is applied thereto, said frequency response defined by a main lobe with a peak output centered at a desired frequency of operation and a plurality of side lobes surrounding said main lobe, wherein an energy $E_1$ associated with said output pulse is produced when said pulse of input power is a rectified pulse of time duration $T_1$, said method comprising the steps of:

controlling amplitude of said pulse of input power to each of said plurality of limited dynamic range amplifiers in accordance with an amplitude shading function to modify each said output pulse such that the width of each said main lobe is realized while said plurality of side lobes surrounding each said main lobe are reduced, said amplitude shading function being a one-half cycle cosine² function with a DC offset applied over a period of time $T_2$ that is greater than said time duration $T_1$ while an energy $E_2$ of said output pulse so modified is approximately equal to said energy $E_1$; and transmitting a plurality of acoustic pulses one right after another into a fluid medium towards a moving target from said plurality of acoustic transducers as driven by said plurality of limited dynamic range amplifiers, each of said plurality of acoustic pulses being of a unique frequency and of a time duration that is approximately one second long, said plurality of acoustic pulses characterized by a separation frequency representing a difference in frequency between numerically successive frequencies of said plurality of acoustic pulses, said plurality of acoustic pulses being staggered with respect to each said unique frequency such that each successively transmitted one of said plurality of acoustic pulses is separated in frequency from an immediately preceding transmitted one of said plurality of acoustic pulses by an amount greater than said separation frequency, wherein echo returns at each said unique frequency are generated.

19. A method according to claim 18 wherein said amplitude shading function is of the form $$R+(1-R)\cos^2\phi$$

where R is representative of a minimum turn-on voltage for each of said plurality of limited dynamic range amplifiers, said minimum turn-on voltage being normalized to 1 volt, and where $\phi$ ranges from $-\pi/2$ to $+\pi/2$.

20. A method according to claim 19 wherein said time duration $T_2$ is approximately determined in accordance with the relationship $$T_2 = \frac{T_1\pi}{\int_{-\pi/2}^{+\pi/2}\{R+(1-R)\cos^2\theta\}^2 d\theta}$$

where $T_1$ time of said output pulse when said pulse of input power is not controlled by said amplitude shading function.

* * * * *